US012565593B2

(12) United States Patent
Illsley et al.

(10) Patent No.: US 12,565,593 B2
(45) Date of Patent: Mar. 3, 2026

(54) LAMINATION PRIMERS AND INKS FOR AQUEOUS INKJET PRINTING

(71) Applicant: SUN CHEMICAL CORPORATION, Parsippany, NJ (US)

(72) Inventors: Derek Illsley, Midsomer Norton (GB); Joanne Guite, Newhey Rochdale (GB); Daniel Morris, Newhey Rochdale (GB); Christopher Daniel, Midsomer Norton (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 232 days.

(21) Appl. No.: 17/923,153

(22) PCT Filed: Jun. 29, 2021

(86) PCT No.: PCT/GB2021/051639
§ 371 (c)(1),
(2) Date: Nov. 3, 2022

(87) PCT Pub. No.: WO2022/003336
PCT Pub. Date: Jan. 6, 2022

(65) Prior Publication Data
US 2023/0348746 A1      Nov. 2, 2023

Related U.S. Application Data

(60) Provisional application No. 63/045,865, filed on Jun. 30, 2020.

(51) Int. Cl.
| | |
|---|---|
| C09D 11/54 | (2014.01) |
| B32B 7/12 | (2006.01) |
| B32B 27/08 | (2006.01) |
| B32B 27/32 | (2006.01) |
| B32B 27/36 | (2006.01) |
| B32B 37/12 | (2006.01) |
| B32B 38/00 | (2006.01) |
| B41F 5/24 | (2006.01) |
| B41J 2/02 | (2006.01) |
| B41J 2/21 | (2006.01) |
| C09D 11/10 | (2014.01) |
| C09D 11/322 | (2014.01) |

(52) U.S. Cl.
CPC .............. C09D 11/54 (2013.01); B32B 7/12 (2013.01); B32B 27/08 (2013.01); B32B 27/32 (2013.01); B32B 27/36 (2013.01); B32B 37/1207 (2013.01); B32B 37/1284 (2013.01); B32B 38/0036 (2013.01); C09D 11/322 (2013.01); B32B 2250/02 (2013.01); B32B 2250/24 (2013.01); B32B 2307/4023 (2013.01); B32B 2307/75 (2013.01); B32B 2451/00 (2013.01)

(58) Field of Classification Search
CPC ..... C09D 11/102; C09D 11/322; C09D 11/38; B41J 2/01; B41J 2/2107; B41F 15/00; B41F 5/24; B41M 5/502
See application file for complete search history.

(56) References Cited

U.S. PATENT DOCUMENTS

| | | | |
|---|---|---|---|
| 9,376,582 B1 | 6/2016 | Dannhauser et al. | |
| 2005/0252418 A1* | 11/2005 | Hoshida ................ | C08F 220/34 |
| | | | 106/415 |
| 2007/0092668 A1 | 4/2007 | Hood | |
| 2015/0116418 A1* | 4/2015 | Oura ......................... | D06P 1/48 |
| | | | 524/207 |
| 2017/0028688 A1 | 2/2017 | Dannhauser et al. | |
| 2017/0247561 A1* | 8/2017 | Nakagawa ........... | B41J 11/0015 |
| 2019/0084321 A1 | 3/2019 | Shigeta | |
| 2020/0094535 A1 | 3/2020 | Schäfer | |

FOREIGN PATENT DOCUMENTS

| | | |
|---|---|---|
| EP | 1 059 173 A2 | 12/2000 |
| JP | 10309863 | 11/1998 |
| JP | 2014019811 | 2/2014 |
| WO | WO2018076068 A1 | 5/2018 |
| WO | WO2018225701 | 12/2018 |
| WO | WO2019124473 A1 | 6/2019 |
| WO | WO 2020/040993 A1 | 2/2020 |
| WO | WO2020039832 A1 | 2/2020 |
| WO | WO 2020/183139 A1 | 9/2020 |

OTHER PUBLICATIONS

International Search Report issued in International Application No. PCT/GB202/051639, mailed Sep. 14, 2021.
Written Opinion of the International Searching Authority issued in International Application No. PCT/GB202/051639, mailed Sep. 14, 2021.
International Preliminary Report on Patentability (Chapter 1 of the Patent Cooperation Treaty) issued in International Application No. PCT/GB202/051639, mailed Oct. 13, 2022.
Third Party Observation issued in International Application No. PCT/GB202/051639, mailed Nov. 1, 2022.
Third Party Observation issued in European Application No. EP20210739765, mailed Sep. 4, 2023.

* cited by examiner

*Primary Examiner* — Jason S Uhlenhake
(74) *Attorney, Agent, or Firm* — Howard C. Lee

(57)          ABSTRACT
Digitally printed laminates prepared from an aqueous primer coating composition and an aqueous pigmented inkjet printing ink wherein the primer coating composition comprises: (a) a water-dispersible polymer and a multivalent metal salt; or (b) a water-soluble polymer selected from copolymers comprising vinyl alcohol and vinyl acetate, copolymers comprising vinyl alcohol and vinyl amine, poly(vinyl pyrrolidone), copolymers comprising vinyl pyrrolidone and vinyl acetate, modified celluloses and water-soluble starches; a water-soluble aminated polymer comprising any blend of primary or secondary amines as part of its molecular structure; and a multivalent metal salt; and wherein the aqueous pigmented inkjet printing ink comprises an anionic polymeric dispersion or an anionic solution polymer.

21 Claims, No Drawings

LAMINATION PRIMERS AND INKS FOR AQUEOUS INKJET PRINTING

CROSS REFERENCE TO RELATED APPLICATIONS

The present application is a § 371 National Phase application based on PCT/GB2021/051639 filed Jun. 29, 2021, which claims the benefit of U.S. Provisional Application No. 63/045,865 the subject matter of each of which is incorporated by reference in their entirety.

The present invention relates to a process for preparing digitally printed laminates comprising applying a primer to a first substrate, printing an aqueous pigmented inkjet printing ink onto the primed substrate via a single pass printing operation and laminating a second substrate to the primed and printed first substrate.

The printed laminates prepared according to the present invention improve sustainability in the packaging market by simplifying the layers of different materials required and thereby making recycling easier. Furthermore, the primers and aqueous inkjet printing inks of the present invention decrease the environmental impact of packaging by replacing potentially harmful solvents with water and reducing or eliminating the potential for contaminants to migrate into the packaged materials.

Currently, in the packaging market, the majority of printed laminate products are produced by conventional printing processes, such as flexographic, gravure and offset printing. With the emergence of inkjet printheads with higher frequency operation, allowing for faster press speeds, the possibility of developing commercially viable single pass inkjet presses for the printing and subsequent conversion (including lamination) to produce flexible laminates and cartonboard laminates is becoming viable. This is particularly the case for single pass inkjet printing of mid-width web presses (i.e. those with web widths of 300 mm or greater) and sheetfed presses used in the production of cartonboard packaging.

Although inkjet printing of narrow-web label and foil substrates is now established, this is predominantly achieved through the printing of radiation-curable inkjet fluids. However, the relatively high film weight deposition of inkjet printing and the need to be able to print low gauge plastic films in the flexible packaging market (for example, polyester film with film thicknesses of 12 μm, or less) means that printing such films with 100% solids content radiation-curable inkjet fluids is not practical. This is due to a number of reasons, including the distortion which occurs of such thin plastic films when the ink cures and shrinks and also the printing of non-uniform print designs which can cause imbalance and hence further distortion in a printed and reeled film. Furthermore, and most significantly, UV-curable inkjet fluid has been associated with health and safety concerns due to the migration of uncured, low molecular weight fragments, such as uncured monomers and photoinitiators, which can migrate from the cured ink film into a packaged foodstuff.

Thus, for the inkjet printing of food packaging, a safer and less practically restrictive technology than UV or EB-curable inkjet would be highly desirable. The current invention addresses these issues through the use of an aqueous pigmented inkjet printing ink, where the solid content of the inks is preferably less than 25% (w/w) of the ink composition thereby allowing for lower printed film weights and preferably where the majority (preferably 60% or more, preferably 70% or more) of the solvent is water, thus being a safer option than radiation-curable inkjet. Furthermore, an anionic polymeric dispersion or anionic solution polymer (also known as an alkali-soluble polymer) is used as a binder in the aqueous pigmented inkjet printing ink (also referred to herein as the aqueous inkjet composition) of the invention. Preferably an anionic polymeric dispersion is used and this is selected from an aqueous anionic polyurethane dispersion, an aqueous anionic acrylic dispersion or an aqueous anionic styrene-(meth)acrylic dispersion, more preferably an anionic polyurethane dispersion. Anionic dispersions typically comprise carboxylic acid (or other acids) as part of their chemical structure. These polymers, dispersed in water, have molecular weights, typically in excess of 1,000 amu (atomic mass unit) and thus pose a lower migration and contamination risk, compared with radiation-curable inkjet.

The current invention shows how such aqueous inkjet compositions can be used in the production of digitally printed laminates, especially of laminates (including flexible and cartonboard laminates) used in the manufacture of food, pharmaceutical, household and personal care packaging, and most especially of food packaging. As will be discussed later, the prior art does not describe how this may be successfully achieved. A further aspect that the invention encompasses is the use of resoluble inkjet printing inks where the concentration of co-solvents, such as propylene glycol, is less than 30% (w/w) of the ink composition. Resolubility is a key property of an inkjet printing ink and relates to how readily an ink, once partially or fully dried, will re-dissolve either into itself or a suitable flushing solvent. If an ink is not resoluble and it dries in an inkjet printhead then it may do so irreversibly, causing permanent blockage of the printhead nozzles and consequent loss in print quality and potential loss of the printhead itself. Commonly, resoluble aqueous inkjet printing ink compositions are achieved through the use of high concentrations of high boiling point water-soluble solvents such as glycerol and propylene glycol, typically 30% (w/w) of the ink composition, or greater. However, the use of such high concentrations of co-solvents, otherwise referred to as humectants, results in inks having very low drying speeds which is undesirable in single pass printing operations. Therefore, in a further aspect, the current invention achieves resoluble inkjet printing ink compositions with concentrations of solvents such as propylene glycol of less than 30% (w/w), preferably by the use of an anionic polyurethane dispersion ('PUD'), preferably an anionic polyurethane dispersion ('PUD') with a hydroxyl value ('OHV') of greater than 50 mgKOH/g, and more preferably greater than 100 mgKOH/g.

As used herein a high boiling point solvent is defined as a solvent having a boiling point of 150° C. or more, typically 200° C. or more, and more typically 250° C. or more. As used herein a water-soluble solvent is a solvent which is miscible with water, for instance having a solubility in water of at least of 2.5% (w/w) at 25° C.

Currently, there are no inkjet printing presses in commercial operation which are able to prepare primed and printed material via the single pass printing of pigmented aqueous inkjet printing inks containing a resin dispersion which can then subsequently be laminated to second substrates to form laminates with widths of greater than 0.3 m, and more preferably 0.5 m, or greater, where the laminates have bond strengths, as measured by a T-Peel bond strength assessment of at least 1.0 N/15 mm and more preferably 1.5 N/15 mm, or greater. The current invention addresses these shortcomings in the market.

The preparation of digitally printed laminates, especially of flexible laminates for the packaging market, via electrographic printing processes has been described, with Hewlett Packard's (HP) Indigo printing process being the current dominant technology. HP uses its proprietary 'Pack Ready' thermal lamination method to produce flexible packaging laminates with plastic films that have been pre-printed with its Indigo 'Electroinks'. The 'Pack Ready' lamination method uses a second plastic film which comprises a heat-sealable layer so that when this second layer is brought into contact with the printed first layer and heat and pressure are applied, the heat-sealable layer of the second film essentially melts to form the weld between the two layers of the laminate. This lamination process enables the on-demand production of laminates which takes advantage of the digital printing process. However, there are a number of perceived drawbacks with the 'Indigo' and 'Pack Ready' printing and lamination processes. The 'Indigo' electrographic printing process is limited in its productivity, both in terms of the achievable press speed and the width of substrate that can be printed. Inkjet printing is a scaleable technology, particularly so with the advent of printheads with ever increasing jetting frequency that enables faster press speeds. With current printhead technology, linear press speeds in excess of 50 m/min, or even greater than 75 m/min are achievable. Furthermore, inkjet printing is not limited in the maximum print width that can be successfully printed, as this is achieved by printhead bars with an increasing number of integrated printheads normal to the direction of press travel. A further disadvantage of the 'Indigo' printing process is the need to transfer the print from a heated transfer cylinder of a press to the substrate to be printed. Temperatures which can be in excess of 90° C. are used to effect this print transfer, and this could be sufficiently high to prevent the printing of thermally sensitive substrates such as polyolefins and substrates having a heat-sealable coating. Furthermore, the Indigo inks are liquid toner compounds comprising paraffinic solvents, which could pose a migration risk if not thoroughly removed before converting the printed packaging material, particularly so if the printed material is to be used in the manufacture of food packaging. The aqueous inkjet inks of the current invention use predominantly water as the solvent, and a preferred co-solvent of the inventive inks is propylene glycol which is generally regarded as safe. The 'Pack Ready' lamination process devised by HP is well suited to digital printing as it enables the 'on-demand' preparation of flexible packaging laminates which can then be supplied in short order through the supply chain. Thermal lamination has been investigated previously with conventional analog printed material and it is a process encompassed by the current invention.

The Landa 'Nanography' digital printing process is another form of thermal transfer printing where a reverse printed image applied to a heated transfer surface is applied to the substrate to be printed. Again, the potential issues of a thermal transfer process will apply. There is also the risk that contaminants in the substrate which is being printed may transfer onto the thermal transfer surface. If this occurs then there is a consequent potential risk of causing issues with subsequent printing like de-wets for instance, if contaminants such as waxes, silicones, oils contaminate the transfer surface. It should be noted that the Nanography process involves the use of inkjet printheads to deposit an aqueous pigmented fluid onto the thermal transfer surface, but the potential issues of thermal transfer processes, as previously outlined are a concern. The current invention overcomes the issues of thermal transfer printing by the direct printing onto the printable surface without any physical contact between the printing apparatus and the substrate to be printed (non-contact printing). This is clearly an advantage, especially where the printable substrates may contaminate the printing apparatus in contact printing processes.

US20190084321 describes a printing and lamination apparatus for the printing of aqueous inkjet inks followed by the subsequent lamination to a second layer. However, US20190084321 does not disclose how satisfactory lamination bond strengths or print quality can be achieved; an issue that the current invention addresses. Furthermore, US20190084321 does not describe how thermal lamination processes can be used to produce 'on-demand' laminates which again the current invention addresses.

WO2018076068 describes an inkjet printing press with a precoating station. The disclosed precoatings comprise aqueous acrylamides, the preparation of which are an essential part of the invention. WO2018076068 does not disclose how lamination may be achieved, which is addressed by the current invention.

WO2020039832 discloses an aqueous inkjet printing ink composition comprising polyurethane dispersions derived from a polyester diol which is suitable for lamination. However, the use of primers according to the current invention to enhance the lamination performance as well as print quality, is not disclosed. More significantly aqueous inkjet printing inks according to the current invention with their excellent resolubility and low co-solvent concentrations are not revealed.

US20200094535 describes a printable, receptive, layer applied to the substrate, comprising of poly(vinyl alcohol) and boehmite particles. However, a minimum dry coating weight of 5 g m$^{-2}$ of this receptive priming layer is claimed with the possibility of applying up to 25 g m$^{-2}$. As discussed herein, the application of such high coat weights to low gauge flexible plastic films is undesirable, and is an element addressed by the current invention where dry coat weights of the primer and ink of less than 5 g m$^{-2}$ are achieved. Furthermore, US20200094535 does not describe how laminates may be formed from the printed flexible films. Yet furthermore, the present inventors have shown that primers based solely on fully hydrolysed (i.e. ≥98% hydrolysed) poly(vinyl alcohol) provide poor lamination bond strengths when used in the preparation of adhesively formed plastic film laminates.

The prior art does not adequately teach how flexible film and cartonboard laminates, produced by the application of a second plastic layer to a first printed layer can be produced with adequate laminate bond strengths when the first layer is primed with an aqueous coating composition and then printed with an aqueous inkjet composition comprising an aqueous polymeric dispersion or aqueous solution polymer, where such polymer dispersions or solution polymers are anionic in nature. Furthermore, there is no disclosure of the use of an anionic polyurethane dispersion having a hydroxyl value of 25 mgKOH/g, or greater, based on the dry polymer weight, in producing such laminates. Such hydroxyl functional polyurethane dispersions, as understood by those skilled in the art, typically have molecular weights of less than 50,000 amu. Thus, in a further aspect of the invention, the use of anionic polyurethane dispersions with molecular weights of less than 100,000, more preferably less than 50,000 and even more preferably less than 25,000, in the preparation of the aqueous inkjet component of the invention is covered.

Examples of primers which may further comprise coagulants, such as multivalent metal salts, to control ink spread, ink bleed, intercolor bleed, mottle and graininess include U.S. Pat. No. 9,376,582, WO2019124473, WO2018225701, JP2014019811, JP10309863, US20070092668. U.S. Pat. No. 9,376,582, which is representative of a series of patents from Eastman Kodak describing a bilayer priming approach for preparing aqueous inkjet print receptive layers on flexible films involving the first down deposition of a tie layer followed by the second down coating with a print receptive layer comprising a hydrophilic polymer, such as poly(vinyl alcohol) and a multivalent metal salt, such as calcium chloride. The current invention, when applied to the preparation of flexible film laminates is simpler in that only one layer of primer is required to be applied to the printable flexible film substrate before printing the aqueous pigmented inkjet printing ink thereon. Furthermore, none of the identified references describe how primers and aqueous inkjet inks according to the current invention may be combined to produce laminates having adequate bond strength, a shortcoming which the current invention addresses.

Furthermore, the inventors have surprisingly shown that water-soluble copolymers containing vinyl acetate are especially effective in delivering laminates with good bond strengths when incorporated into primers of the current invention. The use of such copolymers has not been disclosed in the prior art in the preparation of receptive primers for printing with aqueous pigmented inkjet inks let alone their use in subsequent lamination.

Yet furthermore, the use of aminated polymers such as polyethylene imine and poly(vinyl amine) to further enhance the lamination performance has also not been revealed in the prior art.

The current invention is directed more specifically towards aqueous primer coatings which when printed with aqueous inkjet inks enable the subsequent preparation of laminates by adhesive or thermal lamination process having bond strengths in excess of 1.0 N/15 mm and more preferably 1.5 N/15 mm, or greater, as determined by a T-peel test. However, it should be understood that the aqueous inkjet inks used in the invention are also a key part in enabling digitally printed laminates having desirable print performance and good laminate bond strengths to be achieved.

The pigmented inkjet printing inks of the invention preferably comprise an anionic polyurethane dispersion ('PUD') or an anionic acrylic dispersion which forms, by way of the solid content of the inks, between 1 and 25% (w/w) of the total ink composition and more preferably between 3 and 15% of the ink composition. Anionic PUDs are especially preferred and the inventors have advantageously found that PUDs with hydroxyl values in excess of 25, more preferably in excess of 50 mgKOH/g, based on the dry polymer weight, produce aqueous inkjet inks having superior resolubility, a feature well known in the prior art. Preferably, the anionic PUD is a hydroxyl-functional PUD. Such hydroxyl-functional PUDs are typically produced by end-capping an isocyanate polyurethane prepolymer with a chain terminating group such as diethanolamine. The consequence of using such chain terminating groups, as is well understood, is to produce polyurethanes with lower molecular weights than conventional polyurethane dispersions. The molecular weights of these chain terminated hydroxyl-functional PUDs is usually less than 50,000 and often less than 25,000 amu. The pigmented inkjet printing inks of the invention may further optionally comprise a non-ionic polymeric dispersion such as a non-ionic polyurethane dispersion or a non-ionic acrylic dispersion in addition to the anionic polymeric dispersion or anionic solution polymer.

The use of these hydroxyl-functional PUDs produces inks with enhanced resolubility compared with conventional PUDs. Resolubility can be described as the capacity of a partially, or fully dried ink to re-dissolve back into itself, or into a suitable flushing solution or "varnish". This is desirable as it means that the risk of the irreversible blocking of nozzles in a printhead is reduced. The inventors have found that conventional PUDs, with hydroxyl values of less than 25 mgKOH/g provide poor resolubility when used in aqueous inkjet compositions prepared according to the current invention, most especially with concentrations of solvents such as propylene glycol of less than 30% (w/w). PUDs according to the foregoing have improved resolubility as a consequence of their high hydroxyl value which promotes their resolubility into aqueous fluids and also the lower molecular weight resulting from the preparation of PUDs with such raised hydroxyl values.

For aqueous inkjet ink printing there has been no disclosure of the preparation of laminates using the aqueous primers and aqueous inkjet ink compositions according to the invention. It is therefore believed that the current invention is unique in this respect and offers significant advantage over the identified prior art, as a first-mover technology in the delivery of digitally printed laminates via the single pass printing of aqueous inkjet inks, especially of laminates for the packaging market. The printed inks exhibit good resolubility, particularly where concentrations of co-solvents, such as propylene glycol, are less than 30% (w/w).

Flexible packaging laminates produced by electrographic printing and thermal lamination have been demonstrated by HP's Indigo 'Electroink' printing process allied to their 'Pack Ready' thermal lamination method. A disadvantage of such electrographic printing processes is their limited scaleability, both in terms of the achievable press speed, but also in terms of the maximum press width that can be economically achieved. The current invention, particularly when used in combination with higher frequency printheads, will enable press speeds in excess of 50 m/min and print widths of 0.5 m or more.

The invention will enable the advantages associated with digital printing, compared with current analog printing, to be implemented successfully. Some of those advantages include short print runs, variable print design and variable data printing through a print run, point of sale marketing and advertising, regionalization, personalization, faster turnaround, reduced printed stock.

Compared with electrographic printing processes, as represented by HP's Indigo and 'Pack Ready' processes, the inkjet printing of aqueous inkjet compositions represented by the invention offers the potential for higher throughput in terms of faster press speed.

The prior art describes aqueous primers that enable improved print quality of aqueous inkjet printing, such as reduced mottle and graininess, and reduced intercolor bleed, which the current invention also delivers mainly through the use of the water-dispersible or water-soluble polymers and multivalent salt components of the primers. However, the use of an aqueous inkjet ink comprising an anionic polymeric dispersion or anionic solution polymer, preferably an anionic polyurethane dispersion ('PUD'), in particular an anionic PUD where the PUD preferably has a hydroxyl value of 25 mgKOH/g, or greater, in combination with the primers described herein, to produce laminates having sufficient integrity and strength to perform satisfactorily in their intended applications has not been disclosed in the prior art.

Furthermore, the use of an aminated polymer in the primer, such as polyethyleneimine, in addition to the water-dispersible or water-soluble polymer, to enhance the lamination performance has not been revealed. Yet furthermore, the advantages of using copolymers containing vinyl acetate as the water-soluble component of the primer to deliver even stronger laminate bond strengths has not been disclosed in the prior art. It is also worth noting that the use of copolymers of vinyl pyrrolidone and vinyl acetate as a component of print quality enhancing primers for the printing of aqueous inkjet inks has not been demonstrated in the prior art.

The current invention offers a number of key aspects of novelty and differentiation over the identified prior art and furthermore offers the prospect of the successful implementation of single pass inkjet printing of aqueous inkjet inks in the preparation of a range of laminate applications including flexible packaging, cartonboard packaging and décor. Furthermore, the present invention contributes to increased sustainability for the flexible packaging market by simplifying the layers of different materials required and thereby facilitating recycling.

Citation or identification of any document in this application is not an admission that such represents prior art to the present invention.

DETAILED DESCRIPTION

The invention describes a process of preparing digitally printed laminates involving the steps of:

(i) applying a primer to a first substrate, (ii) printing an aqueous pigmented inkjet printing ink onto the primed substrate of step (i) by a single pass printing process and, (iii) laminating a second substrate to the primed and printed first substrate, wherein the primer is an aqueous coating composition comprising:

(a) a water-dispersible polymer and a multivalent metal salt; or (b) a water-soluble polymer selected from copolymers comprising vinyl alcohol and vinyl acetate, copolymers comprising vinyl alcohol and vinyl amine, poly(vinyl pyrrolidone), copolymers comprising vinyl pyrrolidone and vinyl acetate, modified celluloses and water-soluble starches; a water-soluble aminated polymer comprising any blend of primary or secondary amines as part of its molecular structure; and a multivalent metal salt, and wherein the aqueous pigmented inkjet printing ink comprises an anionic polymeric dispersion or an anionic solution polymer, preferably an anionic polyurethane dispersion or anionic acrylic dispersion, more preferably an anionic polyurethane dispersion preferably having a hydroxyl value of 25 mg KOH/g, or greater, based on the dry matter of the polyurethane dispersion, and further optionally comprises one or more colorant(s), wherein the one or more colorant(s) comprises or is one or more pigment(s) and/or dye(s).

As used herein copolymers comprising vinyl acetate and vinyl alcohol comprise at least 5% vinyl acetate, i.e. partially hydrolyzed PVOH is ≤95% hydrolyzed.

Particularly preferred water-dispersible polymers of the primer (a) include non-ionic and cationic polyurethane dispersions, non-ionic, amphoteric and cationic acrylic homo- and co-polymer dispersions and non-ionic vinyl acetate-containing polymer dispersions.

Preferred multivalent salts used in the preparation of primer (a) include both inorganic and organic derivatives of calcium, magnesium, aluminum, zinc, titanium and zirconium. Blends of salts may be used.

To further enhance lamination, when the primer comprises a water-soluble polymer it also comprises a water-soluble aminated polymer bearing any of primary or secondary amines as part of its molecular structure. Particularly preferred aminated polymers include poly(ethylene imine), poly(vinyl amine), and any copolymers thereof. It will be appreciated that the water-soluble aminated polymer is different from the water-soluble dispersible or water-soluble polymer in the primer. The aminated polymer can enhance the laminate bond strength of the final laminate structure, especially in those flexible plastic packaging laminates produced using an adhesive.

The invention is most advantageously used in the preparation of packaging laminates and includes digitally printed flexible plastic laminates and cartonboard laminates. The invention encompasses laminates prepared via adhesive and thermal lamination processes. For laminates produced using adhesives, the adhesive is preferably applied to the printed first substrate and any solvent-based, solvent-free and/or aqueous adhesives may be used. Both 1-pack (contact) and 2-pack (reactive) adhesives are covered by the invention. Thermal lamination processes of the invention include the use of second substrates having as part of their structure a heat sealable layer and also melt co-extrusion processes where a liquid or molten polymer is applied to the printed surface of the primary substrate to form the desired laminate.

It is preferred that the bond strength of the laminate, between the printed first substrate and the second plastic layer of the laminate, should have a bond strength as determined by a T-peel bond strength assessment, of at least 1.0 N/15 mm, and more preferably at least 1.5 N/15 mm, thereby providing the strength and integrity to make them suitable for their intended applications. As used herein, the T-peel bond strength is the average peeling load and is measured using a JJ Lloyd tensometer with a separation speed of 200 mm/min. The T-peel bond strengths are provided as N/15 mm, i.e. the force required to separate the two films of the laminates, wherein 15 mm strips of the laminates are assessed.

The invention encompasses a method for the preparation of digitally printed laminates involving the application of an aqueous primer to a first substrate followed by the single pass printing of an aqueous inkjet printing ink composition with subsequent lamination to a second or more substrates. The invention is preferably directed towards the preparation of packaging laminates including flexible film laminate packaging and cartonboard-based laminate packaging, but also encompasses décor laminates.

The primers of the invention are applied to the first (i.e. primary) substrate and dried prior to printing with the aqueous inkjet compositions of the invention. Preferably, the primers of the invention are applied directly to the first substrate (i.e. there is no intervening or tie-layer between the substrate and the primer). The aqueous primer is applied to the primary substrate to preferably achieve a dry film weight of between 0.1 and 5.0 grams $m^{-2}$.

Preferably, the primers of the invention are applied to the first substrate and dried in air using conventional driers, typically warm/hot air drying stations that are commonly used in flexo printing presses. As will be understood by the skilled person the drier temperature is dependent on the substrate but typically, such driers run between 40-100° C. air temperatures. Alternatively, the primers of the invention are applied to the first substrate and preferably dried under the action of near infrared (NIR) driers.

The aqueous inkjet printing ink compositions of the invention preferably comprise a dispersed pigment and an anionic polymeric dispersion or anionic solution polymer, preferably an anionic polymeric dispersion, more preferably an anionic polyurethane dispersion. Especially preferred are anionic polyurethane dispersions having a hydroxyl value of greater than 25 mg KOH/g, and more preferably those having hydroxyl values of greater than 50 mg KOH/g, based on the dry polymer matter. Alternatively, the aqueous inkjet printing ink compositions of the invention preferably comprise a dispersed pigment and an anionic acrylic dispersion.

The aqueous inkjet compositions of the invention further comprise any blend of water-soluble solvents including, but not limited to, propylene glycol, glycerol, and glycol ethers. It is preferred that the co-solvents used in the aqueous inkjet inks should form less than 30% (w/w) of the ink composition and more preferably 25% (w/w) or less of the ink composition. It is further preferred that the co-solvents used to prepare the aqueous inkjet inks should have boiling points of less than 250° C. and more preferably less than 200° C. Preferably, the aqueous inkjet ink of the invention does not include paraffinic solvents. The aqueous inkjet inks of the invention may be applied via single pass printing processes including web-fed and sheet-fed printing operations. For single pass web-fed printing, press speeds in excess of 25 m/min and more preferably in excess of 50 m/min are achievable. The print design may be applied via reverse-print or direct print designs, depending on the desired laminate structure. For sheet-fed printing operations press speeds in excess of 1,500 and more preferably in excess of 2,500 sheets per hour are achievable.

Prior to lamination, the printed surface may have an overprint lacquer applied, but this is not an essential feature of the invention and it should be understood that the invention is preferably directed towards the direct lamination of the printed primary substrate without further printing or lacquering operations.

After printing the primed primary substrate, a lamination process is used to produce the desired final laminate. The invention encompasses flexible plastic laminates used in packaging applications, including those laminates which may contain aluminum foils and coated plastic films as part of their structures. Such flexible packaging laminates can be prepared via adhesive or thermal lamination processes, as well recognized in the industry.

For adhesive lamination an adhesive is preferably applied to the printed surface, but in an alternative aspect the invention also covers the possibility of an adhesive being applied to the secondary substrate which is then brought into contact with the printed primed primary substrate. The adhesives used in the preparation of flexible packaging laminates include solvent-based, solvent-free and aqueous adhesives, both 1-pack (contact) and 2-pack (reactive) adhesives being encompassed by the invention. Where 2-pack adhesives are used these include polyisocyanate-polyol and reactive epoxy types. Flexible packaging laminates may also be produced by thermal lamination processes where the second (and further) substrates have a heat-sealable surface as part of their structure. This heat-sealable surface may be applied via a coating or a melt co-extrusion process, as well recognized in the industry.

For cartonboard laminates, which includes those substrates which may already have other layers including aluminum foils and plastic layers laminated to the reverse side to the printing surface, the printed surface may be preferably laminated to further plastic layers via thermal or melt co-extrusion processes. In the context of the invention melt-co-extrusion means that a molten or liquid layer of the second (and subsequent) plastic layer is applied to the printed surface of the first substrate to deliver the desired laminate. It is preferred that the second laminated layer is polyolefinic in nature, with polyethylenes being particularly preferred. The invention covers low density polyethylene, linear low density polyethylenes, and co-extruded polyethylenes.

Although the invention is preferably directed towards packaging laminates including those used in the food, pharmaceutical, personal care and household packaging markets, the invention also includes the preparation of décor laminates where the primers and aqueous inkjet inks of the invention are applied to poly(vinyl chloride) (PVC') or copolymers of vinyl chloride prior to lamination to further PVC films via thermal or melt co-extrusion processes.

Definitions

Hydroxyl Value (OHV)—this is defined as the number of milligrams of potassium hydroxide required to neutralize the acetic acid taken up on acetylation of one gram of a chemical substance that contains free hydroxyl groups. The hydroxyl value is suitably measured in accordance with the ISO 4629-1:2016(E) standard.

Acid Value (AV)—the mass of potassium hydroxide (KOH) in milligrams that is required to neutralize one gram of chemical substance. The acid value is suitably measured in accordance with the ISO 2114:2000(E) (method B) standard.

Amine Value (AmV)—the mass equivalent of potassium hydroxide that is required when one gram of substance is neutralized with a suitable acid (typically hydrochloric acid). The amine value is suitably measured in accordance with the DIN 53176:2002-11 standard.

Molecular weight—"molecular weight" or "average molecular weight" is a reference to the weight average molecular weight (Mw). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, MA, USA) and THF as mobile phase. The skilled person will appreciate that this definition of molecular weight applies to polymeric materials which typically have a molecular weight distribution.

Particle size/average particle size—the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v, 0.5)" value). Particle size is preferably measured by laser light diffraction.

Resolubility—this is the capacity of a dried/drying ink to redissolve into itself or a suitable flush. A flush is a solution comprising water, co-solvents and additives (surfactants, amines) designed to clean printheads. Resolubility can be measured by applying a 60 μm ink film to a glass slide using a No. 6 K-Bar applicator (ex. RK Print). The inks are then dried for 30 minutes at 40° C., before being immersed in an aqueous solution comprising 25% propylene glycol, 0.2%

Tegowet KL245 and 0.2% of triethanolamine (this is the flush and is also referred to as 'Varnish'). As used herein resolubility is assessed as: "Highly Resoluble" meaning that the dried ink film dispersed in the flush in less than 2 minutes, with no visible signs of any undissolved ink; "Resoluble" meaning that the dried ink film dispersed in the flush in 2 to 5 minutes, with no visible signs of any undissolved ink; "Partial" meaning that there is evidence of the ink dispersing in the flush, but with minor undissolved ink particles persisting for more than 5 minutes; "Slight" meaning that the ink print breaks up in to flakes which persist for more than 5 minutes, with very little evidence of the ink redispersing into the flush; "Insoluble" meaning that there is no evidence for the ink redispersing into the soaking medium.

The invention describes a method for the preparation of digitally printed laminates involving, as a first step, the application of an aqueous primer to a first substrate, then as a second step the single pass printing of an aqueous inkjet composition onto the primed substrate of the first step, followed by a third step of laminating a second (or more) substrate (or layer) to the printed first substrate. The first substrate can be selected from any flexible or rigid plastic type or a paper-based substrate including paperboard substrates used in the manufacture of cartonboard packaging. The second, laminating, substrate or layer of the inventive method is a plastic and may be applied via adhesive or thermal lamination processes.

There is growing interest in the use of single pass inkjet printing in a number of industrial applications, including packaging, décor, metal decoration and textiles. There is a very well-established history of analog printing in these sectors with the packaging market utilizing gravure, flexographic and offset printing techniques. Flexographic printing, in particular, has advanced significantly over the last 10 years or so, with the advent of high definition flexo printing and presses where printing cylinder changeover between jobs can be completed in 5 minutes or less (but not instantaneously, as is possible with digital printing). It is likely that such printing techniques will continue to control a major share of the volume of material produced in the packaging sector for the foreseeable future, where high volume uniform print designs are required. However, digital printing can be advantageous in a number of well-understood ways, including short run length printing, variable print design (during a single print run), variable data printing, regionalization, personalization, point-of-sale marketing and advertising. Since it is possible to digitally print on a demand basis, with a consequent shortening of the supply times involved, this also has the consequential significant benefit of reducing the amount of printed stock that has to be warehoused prior to delivery, compared with conventional analog printing.

The advantages offered by non-contact printing with inkjet printing are numerous, especially with the advent of inkjet printheads with ever faster jetting frequency enabling printing presses with faster linear press speeds. The aqueous inkjet inks encompassed by the current invention allow for the development of single pass presses with linear press speeds of at least 25 m/min, preferably at least 50 m/min, and more preferably at least 75 m/min. Where the aqueous inkjet inks of the current invention are used in sheet-fed single pass printing processes the aqueous inkjet inks of the invention will allow for single pass inkjet presses which can print at least 1,000 sheets per hour, preferably at least 2,000 sheets per hour and more preferably 3,000 sheets per hour. A further advantage with inkjet printing, compared with digital electrographic printing, is that it can increase productivity not only through press speed but also through the maximum width of printing. Thus, single pass inkjet printing is adaptable to the printing of substrates having widths of 500 mm, or greater.

In the packaging market space, where the current invention is favorably employed, there is already significant commercial exploitation of the single pass printing of narrow web label stock. The dominant inkjet technology used in the narrow web label sector is solvent-free UV-inkjet where the inkjet inks comprise a blend of pigment, low molecular weight monomers and photoinitiators. The current invention, although being applicable to the narrow web printing sector, is more advantageously used in the mid- to wide web and sheet-fed printing sectors where the width of the substrate to be printed is greater than 300 mm, and more preferably 500 mm, or greater.

In the printing of flexible packaging films, printing with aqueous inkjet inks is seen to be beneficial for a number of reasons:

(a) Aqueous inkjet inks, as encompassed by the invention, preferably have solid contents of less than 30% (w/w) of the ink composition. So, after drying, the inks will produce prints with film thicknesses typically in the range 0.5 to 5 microns (preferably in the range of 1.5 to 5 microns) which is significantly less than can be achieved with solvent-free UV-curable inkjet compositions.

(b) The aqueous inkjet ink compositions of the invention are based predominantly on dispersed pigment, an anionic polymer solution or dispersion including anionic polyurethane dispersions and co-solvents, like propylene glycol, and as such pose a lower risk with respect to the potential contamination of packaged goods, including foods, than UV-curable inkjet inks where uncured monomers and photoinitiator residues are well known to be highly prone to migration from the print into the packaged goods including foodstuffs causing unwanted and potentially harmful contamination of the packaged goods.

(c) Since the aqueous inkjet inks of the invention comprise a significant amount of water, as part of their composition, preferably 40% (w/w) or greater, they have a more benign environmental impact than either UV-curable or solvent-based inkjet compositions.

Accordingly, the aqueous inkjet inks of the present invention contribute towards the development of sustainable flexible packaging by reducing potentially harmful solvents and contaminants in the inks.

The aqueous primer coating, which is a key element of the invention provides the following desirable properties when printed with the aqueous inkjet inks of the invention and subsequently laminated: (a) it enhances the print quality by reducing line spread and dot gain, reducing ink bleed and intercolor bleed and by reducing mottle and graininess; all terms well understood by those skilled in the art; and (b) it also enables the preparation of printed laminates having satisfactory bond strengths.

The aqueous primer coating of the invention may be applied by any method, including inkjet printing, but coating via flexographic or gravure printing methods are preferred. The dry film weight of the primer coating applied to the first substrate of the invention, after drying is preferably in the range 0.1 to 10.0 g m$^{-2}$, more preferably in the range 0.1 to 5.0 g m$^{-2}$, even more preferably in the range 0.1 to 2.5 g m$^{-2}$ and most preferably in the range 0.2 to 2.5 g m$^{-2}$.

The inventive primer coating comprises either: (a) a water-dispersible polymer and a multivalent metal salt; or (b) a water-soluble polymer selected from partially hydrolyzed poly(vinyl alcohol), copolymers containing vinyl alcohol and vinyl amine, poly(vinyl pyrrolidone), copolymers containing vinyl pyrrolidone and vinyl acetate, modified celluloses and water-soluble starches, a water-soluble aminated polymer comprising any blend of primary or secondary amines as part of its molecular structure, and a multivalent metal salt.

The water-dispersible polymer used in the primer can be non-ionic or cationic. Preferably, the water-dispersible polymer used in the primer is non-ionic, more preferably a non-ionic PUD or non-ionic acrylic dispersion. Preferably, the water-dispersible polymer used in the primer is cationic, more preferably a cationic acrylic dispersion. It is preferred that the acid value of the water-dispersible polymer, based on dry polymer weight, should be less than 10 mgKOH/g.

Partially hydrolyzed poly(vinyl alcohol)s (also referred to as copolymers of vinyl alcohol and vinyl acetate), poly(vinyl pyrrolidone) and copolymers of vinyl pyrrolidone and vinyl acetate have been found to be particularly favorable water-soluble polymers in preparing primers of the invention. Preferably, the water-soluble polymer is a partially hydrolyzed poly(vinyl alcohol) and/or a copolymer of vinyl pyrrolidone and vinyl acetate. As used herein, a partially hydrolyzed poly(vinyl alcohol) is ≤95% hydrolyzed.

Preferably, the vinyl acetate content of a copolymer is at least 10% (w/w), and preferably no more than about 50% (w/w).

The water-dispersible or water-soluble polymer should form, on dry weight, between 2.5 and 50.0% (w/w) of the primer coating composition, preferably between 5.0 and 40.0% and more preferably between 5.0 and 30.0%.

Preferably, the water-soluble polymer is a copolymer of vinyl acetate and vinyl pyrrolidone. Preferably, the copolymer of vinyl acetate and vinyl pyrrolidone comprises at least 25% (w/w) of vinyl acetate as part of the dry polymer, preferably at least 30% (w/w) of vinyl acetate as part of the dry polymer, preferably at least 35% (w/w) of vinyl acetate as part of the dry polymer, and preferably no more than 50% (w/w).

Preferably, the water-soluble polymer is a partially hydrolyzed poly(vinyl alcohol) (also referred to herein as a copolymer of vinyl alcohol and vinyl acetate), and in this embodiment the vinyl acetate content is preferably from 5 to 25% (w/w), preferably 10 to 17% (w/w).

The primer coating also comprises a multivalent metal salt which acts as a coagulating agent for the aqueous inkjet printing ink of the invention after it is printed onto the first primed substrate. This coagulation process helps to 'fix' the ink, reducing the extent to which it flows out on the substrate thereby reducing dot gain, line spread, ink bleed and intercolor bleed. The coagulation process is further enhanced when the aqueous inkjet ink of the invention is anionic. Preferably, the use of an anionic polyurethane dispersion (PUD), wherein the acid value of the PUD, based on the dry polymer weight is preferably at least 10 mgKOH/g, contributes to the anionic nature of the aqueous inkjet ink. Alternatively, an anionic acrylic dispersion, anionic styrene-acrylic dispersion or anionic solution polymer (preferably an anionic acrylic solution polymer) can be used to generate or contribute to the anionic nature of the aqueous inkjet ink. Such anionic polymeric materials (including PUDs) typically comprise carboxylic acid groups as part of their chemical structure which participate in the "fixing" process.

As understood in the printing art, the term "solution polymer" (also known as an alkali-soluble polymer) typically refers to an acrylic or styrene-acrylic copolymer usually comprising acrylic or methacrylic acid as part of the monomer blend. Suitable solution polymers are copolymers which comprise any of acrylic acid, methacrylic acid, maleic anhydride, itaconic acid, along with any blend of ethylenic, acrylic or methacrylic monomers including but not limited to styrene, methyl methacrylate, butyl acrylate, butyl methacrylate, ethyl acrylate, ethyl methacrylate, ethylhexyl acrylate, ethylhexyl methacrylate. Typically, the acid value of these copolymers is in excess of 100 mgKOH/g. When the carboxylic acid groups of the polymer are neutralized with a base including but not limited to ammonia, amines (e.g. triethylamine triethanolamine) or inorganic bases (e.g. NaOH, KOH), the polymers can then be dissolved in water to form an aqueous solution. The molecular weight of such water-soluble (neutralized) polymers is typically less than 20,000.

The multivalent metal salts may comprise inorganic or organic anions, including but not limited to chloride, sulphate, nitrate, carbonate, hydrogencarbonate, acetate, pivalate, laurate, citrate. Preferably, the multivalent metal salt is calcium chloride. The multivalent metal salt may comprise, on dry weight, from 0.1 to 50.0% (w/w) of the primer composition, more preferably between 0.5 and 50.0% (w/w), even more preferably between 0.5 and 25.0% (w/w) of the primer composition, and most preferably between 0.5 and 18% (w/w) of the primer composition.

It is preferred that, when used, the aminated polymer should have an amine value, based on the dry polymer, of at least 50, and more preferably at least 100 mgKOH/g. Non-limiting examples of suitable aminated polymers include polyethylene imines and poly(vinyl amines), copolymers comprising vinyl amine, aminated starches, amine-functional poly(ethylene glycol)s, amine-functional poly (propylene glycol)s. Preferably, the aminated polymer is polyethylene imine. Where aminated polymers are used in the preparation of inventive primers it is preferred that they constitute between 0.1 and 20.0%, and more preferably between 0.5 and 10.0% (w/w) of the primer coating based on the dry weight of the aminated polymer. In a further facet of the invention the amount of aminated polymer added to the primer should be sufficient to raise the amine value of the primer coating, based on the dry coating weight, by at least 5.0 mgKOH/g.

Preferably, the aqueous coating composition comprises a water-soluble polymer selected from copolymers comprising vinyl alcohol and vinyl acetate, poly(vinyl pyrrolidone) and copolymers comprising vinyl pyrrolidone and vinyl acetate; a water-soluble aminated polymer selected from polyethylene imines and poly(vinyl amines), aminated starches, amine-functional poly(ethylene glycol)s and amine-functional poly(propylene glycol)s; and a multivalent metal salt.

The primers may also optionally comprise any additional aqueous polymer dispersion selected from epoxy and polyester, where the acid value of the polymer based on dry polymer weight is 10 mgKOH/g, or less.

It will be appreciated that the aqueous primer composition used in the present invention must include water. This should preferably not contain ionic impurities and is therefore preferably ion exchanged or distilled water. The amount of water, including that which is supplied as part of the raw materials, is preferably 20 to 80%, more preferably 30 to 70% (w/w) of the entire primer composition.

The primers may also include any co-solvent, including but not limited to; ethanol, propanol, butanol, acetone, propylene glycol, glycerol, glycol ethers. It should be understood that the primers may also comprise any number of additives including, but not limited to surfactants, wetting aids, antifoams, de-aerators, biocides. A list of such possible additives is provided later on under the description of the aqueous inkjet inks of the invention. Preferably, the co-solvent in the primer is present in amount of 30% (w/w) or less of the primer, more preferably 20% (w/w) or less of the primer, even more preferably 10% (w/w) or less or the primer.

The primers may also optionally comprise any dispersion of an inorganic material, including but not limited to silica, alumina and clay. Cationic silica and alumina dispersions, including colloidal and fumed types are preferred types. Preferably, cationic silica is chloride stabilized.

Preferably, the primers comprise an aqueous silica dispersion, more preferably an aqueous dispersion of colloidal silica. Preferably, the silica is anionic silica, more preferably anionic colloidal silica. Preferably, anionic silica is stabilized sodium or ammonium ions. Preferably the silica is an organically modified silica such as a silane or aluminate modified anionic colloidal silica, more preferably the silica is silane modified anionic silica. Preferably, the silica has a particle size of 5 to 100 nm.

The inventors have also surprisingly found that organically modified silica dispersions, as represented by Akzo Nobel's Bindzil CC range, may also be used in the preparation of primers according to the invention and when used these organically modified silica dispersions improved the block resistance of the primers whilst maintaining satisfactory laminate bond strengths. This is a surprising, and unique, finding since the Bindzil CC range are anionically stabilized and it would be expected that such dispersions would be unstable in the presence of the multivalent salts contained in the primer. Whilst not wishing to bound by theory, the inventors believe that the silane modification of these silicas (achieved via the sol-gel reaction with 3-gly-cidyloxypropyl)trimethoxysilane) prevents the colloidal silica particles from forming aggregates and coming out of suspension in the presence of the multivalent metal salt.

The primers may also optionally comprise an inorganic particle which may be selected from a silica, alumina, calcium carbonate, or a clay.

The primers may have solid contents of between 5.0 and 50.0% (w/w) and more preferably between 5.0 and 30.0% (w/w).

The primers may optionally comprise a crosslinker, which may be selected from the following non-limiting examples: polycarbodiimides (for example, Carbodilite, ex. Nis-shinbo), oxazoline-functional polymer crosslinkers (e.g. Epocros, ex. Nippon Shokubai), Melamine-formaldehydes (for example, Maprenal, ex. Ineos Melamines), blocked isocyanates (for example Vestanat, ex. Evonik), epoxies (for example Polycup, ex. Solenis), zinc ammonium carbonate solutions, nano zinc oxide (for example Oxylink, ex. Buhler).

The aqueous inkjet compositions of the invention comprise a pigment and an anionic polymeric dispersion. Preferably, the aqueous inkjet compositions of the invention comprise a dispersed pigment and an anionic polyurethane dispersion or anionic acrylic dispersion, with anionic PUDs being most preferred. The aqueous inkjet composition may further comprise a non-ionically stabilized PUD in addition to the anionic polymeric dispersion and in this aspect there is no restriction on the nature of the PUD. Accordingly, both anionic and non-ionically stabilized PUDs are encompassed by the invention (provided that the aqueous inkjet ink comprises an anionic polymeric dispersion) as are aromatic and aliphatic PUDs. It is preferred that the PUD has a hydroxyl value of at least 10 mgKOH/g, more preferably greater than 25 mgKOH/g, and even more preferably greater than 50 mgKOH/g. A further aspect of the invention is that the average particle size of the PUDs should preferably be less than 500 nm and more preferably less than 200 nm and even more preferably less than 100 nm. The invention further encompasses PUDs with weight average molecular weights of less than 100,000 and more preferably less than 50,000 and even more preferably less than 25,000. The invention also encompasses those PUDs having acid values (of the dry resin) of 10 mgKOH/g, or greater.

There are a variety of commercially available PUDs that can be used in the invention including those sold under the trademarks Neorez (DSM), Bayhydrol (Covestro), Sancure (Lubrizol), Syntegra (Dow), Luplen (BASF), Beetafin (BIP) and Daotan (Allnex).

The invention may also encompass aromatic and aliphatic PUDs and further encompasses PUDs produced from polyether diols, polyester diols, polyacrylic diols and polycarbonate diols or any blend or hybrid thereof. As previously stated, the PUDs may be anionic or non-ionic in terms of their stabilization (provided that the inkjet composition comprises an anionic polymer dispersion or anionic solution polymer), or a combination of the two stabilization mechanisms. Anionic PUDs are commonly produced by the inclusion of a carboxylic acid into the polymer structure of the PUD for example by the urethane reaction of dimethylol propionic acid ('DMPA'). Where DMPA, or other acid-containing species, is incorporated into the PUD backbone then it may be neutralized with any organic or inorganic base to enable the anionic stabilizing mechanism. These various resin types may, where applicable, be neutralized using organic bases, including, but not limited to, ammonia, triethylamine, tripropylamine, triethanolamine, tripropa-nolamine, triisopropanolamine, dimethyl aminoethanol, N-methyldiethanolamine or arginine. Alternatively, they may be neutralised by an inorganic base including but not limited to alkali metal oxides, alkali metal hydroxides or alkali metal carbonates, with sodium hydroxide or potassium hydroxide being the preferred inorganic bases.

A preferred anionic polymeric dispersion used in the aqueous inkjet ink of the invention is an anionic acrylic dispersion. Preferably the anionic acrylic dispersion has a hydroxyl value of greater than 100 mgKOH/g.

A further preferred anionic polymeric dispersion used in the aqueous inkjet ink of the invention is an anionic styrene-(meth)acrylic dispersion, preferably having a hydroxyl value of greater than 100 mgKOH/g. Suitable styrene-(meth) acrylic resin dispersions are widely available commercially and include those sold under the trade names Joncryl (BASF), Revacryl (Synthomer), Hycar (Lubrizol), Neocryl (DSM), Neboplast (Necarbo), and the Picassian AC range (Picassian Polymers). It should be understood that this is not a limiting list and those skilled in the art should appreciate that any other styrene-(meth)acrylic resin dispersion meeting the requirements previously laid out could be used.

Optionally, the aqueous inkjet ink of the invention may comprise an anionic acrylic dispersion and/or styrene-(meth)acrylic dispersion in addition to the preferred anionic PUD. In particular, the aqueous inkjet ink of the invention may comprise a styrene-(meth)acrylic dispersion in addition to the preferred anionic PUD.

Preferably, the solid content of the aqueous inkjet inks is less than 25% (w/w) of the ink composition.

The preferred aqueous inkjet inks of the invention which comprise an anionic polymeric dispersion may further comprise a solution polymer (i.e. an alkali-soluble polymer), preferably those described herein.

It will be appreciated that the aqueous ink inkjet composition used in the present invention includes water. This should preferably not contain ionic impurities and is therefore preferably ion exchanged or distilled water. The amount of water, including that which is supplied as part of the raw materials used, is preferably 20 to 80%, more preferably 30 to 70% by mass according to the entire ink composition.

The inkjet inks may also contain one or more water-compatible organic solvents, preferably at a level of between 1 and 40% by mass according to the entire ink composition. Preferably, the water-compatible organic solvents are present in amounts of 30% (w/w) or less of the entire ink composition, more preferably 25% (w/w) or less. Examples of suitable solvents may include those which are not highly flammable or volatile, typically a polyol, an alkylene glycol, an alkylene glycol ether or ether acetate type, with the following non-limiting examples: 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, 3-methoxy-3-methyl-1-butanol, N-methyl pyrollidone, urea, and the like.

Since the products of the current invention are primarily water-based in nature, it is also preferable to include a biocide or anti-mold agent. Suitable examples include products based on the following biocide structural types: benzisothiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. Defoamers are particularly important with recirculating printheads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives are often optionally used to control the surface tension of the ink, which is required to adjust the wetting on the face plate of the printhead, and also to give the desired drop spread on the substrate. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont. Also suitable for use in the aqueous inkjet ink compositions of the invention are the non-ionic Hydropalat range from BASF. Where such surfactants are used in the preparation of inventive aqueous inkjet inks it is preferred that they are used to lower the surface tension (measured using an AquaPI tensiometer supplied by Kibron) of the inks to the desired range of 24 to 38 Dynes/cm, more preferably to between 25 and 35 Dynes/cm. For an aqueous inkjet ink set comprising as a minimum of a cyan, a magenta, a yellow and a black ink the surface tensions of the inks across the set may be equivalent or different.

Included in the ink formulation can optionally be a suitable de-aerator. These prevent the formation of air inclusions and pinholes in the cured coating. These also reduce rectified diffusion, which can cause reliability issues in the printhead. Examples include the following products available from Evonik: TEGO AIREX 900, 910, 916, 920, 931, 936, 940, 944, 945, 950, 962, 980, and 986.

The inkjet compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like. Preferably, the inkjet composition comprises one or more pigment(s).

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments P05, P015, P016, P031, P034, P036, P043, P048, P051, P060, P061 and P071; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer after milling with a preferred particle size distribution of 10-500 nm, more preferably 10-350 nm to have better transparency and a wide color gamut.

In order to incorporate the above-described pigments to the inventive compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles.

Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not strictly limited as long as the resin dispersant is equal to or more than the neutralization equivalent.

Examples of the surfactants used for the pigment dispersion include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

The substrates to which the primers and inkjet inks may be applied include, for example, plastic or paper-based types. Plastic substrates preferably include flexible films which may be selected from any of the following non-limiting list; polyester (PET), nylon, polypropylene (PP), polyethylene (PE), cellulose acetate, poly(vinyl chloride) (PVC). For the preparation of flexible plastic laminates polyester, nylon, polypropylene and cellulose acetate films and coated derivatives thereof are preferred. Also encompassed by the invention are those substrates which themselves are laminates including but not limited to co-extruded polyethylene/ethylene vinyl alcohol copolymers laminates. The plastic substrate of the first primed and printed layer may be either cast or oriented including oriented PET (OPET), oriented PP (OPP) and bioriented PP (BOPP). The first layer of the laminate may also be any coated film of those previously described including those coated with aluminum (metallized films), aluminum oxide ('AlOx'), silicon oxide (' SiOx'), copolymers of ethylene and vinyl alcohol. The first plastic layer may also be an opacified version, especially of poly(propylene). The first substrate may also be an aluminum film.

For the preparation of cartonboard laminate packaging the primers and inkjet inks of the invention are applied to a suitable paper-based (cartonboard) substrate which may be in the form of sheets or reels. The cartonboard substrate is selected from those with a weight of greater than 50 g m$^{-2}$, and which furthermore have a surface coating applied to them. The coatings include those formed from water-soluble polymers such as starch and poly(vinyl alcohol) compounded with inorganic fillers, as is well known in the art.

Prior to lamination the printed surface may have an overprint lacquer applied, but this is not an essential feature of the invention and it should be understood that the invention is preferably directed towards the direct lamination of the printed primary substrate without further printing or lacquering operations.

Preferably, the dry coat weight of the primer and ink applied to the substrate is less than 5 g m$^{-2}$.

Preferably, the process of the present invention includes direct printing onto the printable surface without any physical contact between the printing apparatus and the substrate to be printed (i.e. non-contact printing). Thus, the issues of thermal transfer printing are overcome.

Preferably, only a single primer layer is applied to the first substrate before printing the aqueous inkjet ink. Thus, preferably the primer is applied directly to the first substrate and the aqueous inkjet ink is applied directly to the primed substrate. Thus, it is preferred that there is no intervening or tie-layer between the first substrate and the primer layer, and no intervening or tie-layer between the primer layer and the inkjet ink.

Preferably, in the process of the present invention the primer is applied directly to the first substrate and the aqueous pigmented inkjet printing ink is printed directly onto the primed surface of the substrate. Preferably, the second substrate is laminated to a first side of the first substrate, wherein the first side of the first substrate is primed and printed.

It will be appreciated that the aqueous pigmented inkjet printing ink is suitably printed onto the primed substrate by inkjet printing.

After printing the primed primary substrate, a lamination process is used to produce the desired final laminate. The invention encompasses flexible plastic laminates used in packaging applications, including those laminates which may contain aluminum foils and coated plastic films as part of their structures. Such flexible packaging laminates can be prepared via adhesive or thermal lamination processes, as well recognized in the industry. For adhesive lamination an adhesive is most likely applied to the printed surface, but the invention also covers the possibility of an adhesive being applied to the secondary substrate which is then brought into contact with the printed primed primary substrate. The adhesives used in the preparation of flexible packaging laminates include solvent-based, solvent-free and aqueous adhesives, both 1-pack (contact) and 2-pack (reactive) adhesives being encompassed by the invention. Preferably, 2-pack solvent-based, solvent-free or aqueous compositions comprising an isocyanate functional reactive component are used. More preferably, where 2-pack adhesives are used these include polyisocyanate-polyol and reactive epoxy types. Flexible packaging laminates may also be produced by thermal lamination processes where the second (and further) substrates have a heat-sealable layer as part of their structure. This heat-sealable layer may be applied via a coating or a melt co-extrusion process, as well recognized in the industry.

For cartonboard laminates, which includes those substrates which may already have other layers including aluminum foils and plastic layers laminated on the reverse side to the printing surface, the printed surface may be preferably laminated to further plastic layers via thermal or melt co-extrusion processes. In the context of the invention melt-co-extrusion means that a molten or liquid layer of the second (and any subsequent) plastic layer is applied to the printed surface of the first substrate to deliver the desired laminate. It is preferred that the second laminated layer is polyolefinic in nature, with polyethylenes being particularly preferred. The invention covers low density polyethylene, linear low density polyethylenes, and co-extruded polyethylenes.

Although the invention is preferably directed towards packaging laminates including those used in the food, pharmaceutical, personal care and household packaging markets the invention also includes the preparation of décor laminates where the primers and aqueous inkjet inks of the invention are applied to poly(vinyl chloride) (PVC') or copolymers of vinyl chloride prior to lamination to further PVC films via thermal or melt co-extrusion processes.

It is preferred that laminates prepared by the invention should have sufficient strength and integrity to make them suitable for their intended applications. It is preferred that the minimum bond strength of the laminate between the printed primary substrate and the laminated second layer, as determined by a T-peel bond strength assessment should be at least 1.0 N/15 mm, and more preferably 1.5 N/15 mm, or greater. It should also be understood that these minimum bond strengths should be achieved over printed and non-printed areas (where only the primed surface is being laminated) of the primed and printed first substrate.

Preferably, the laminates prepared according to the invention have widths of 0.3 m or greater, and more preferably 0.5 m or greater. Preferably, the laminates prepared according to the invention have widths of 0.3 m or greater, and more preferably 0.5 m or greater and have bond strengths, as measured by a T-Peel bond strength assessment of at least 1.0 and more preferably 1.5 N/15 mm, or greater.

The invention is further described by the following numbered paragraphs:

1. A process for preparing digitally printed laminates, comprising the steps of:
   (i) applying a primer to a first substrate;
   (ii) printing an aqueous pigmented inkjet printing ink onto the primed substrate of step (i) via a single pass printing operation;
   (iii) laminating a second substrate to the primed and printed first substrate of steps (i) and (ii);

wherein;
   (a) the primer is an aqueous coating composition comprising a water-dispersible or water-soluble polymer and a multivalent metal salt; and
   (b) the aqueous inkjet printing ink comprises a polyurethane dispersion.

2. The process of paragraph 1, wherein the primer further comprises a water-soluble aminated polymer comprising any blend of primary or secondary amines as part of its molecular structure.

3. The process of paragraph 1, wherein the t-peel bond strength of the laminate is 1.0 N/15 mm, or greater.

4. The process of paragraph 1, wherein the water-dispersible polymer is selected from the group consisting of non-ionic polyurethane dispersions, cationic polyurethane dispersions, non-ionic acrylic dispersions, cationic acrylic dispersions, amphoteric acrylic dispersions and combinations thereof.

5. The process of paragraph 1, wherein the water-soluble polymer is selected from the group consisting of poly(vinyl alcohols), copolymers comprising vinyl alcohol and vinyl acetate, poly(vinyl pyrrolidone), copolymers comprising vinyl pyrrolidone, vinyl acetate, water-soluble starch and combinations thereof.

6. The process of paragraph 5, wherein the vinyl acetate content of any copolymer is 10% (w/w), or greater.

7. The process of paragraph 1, wherein the multivalent metal salt is selected from the group consisting of calcium, magnesium, aluminum, zinc, titanium, zirconium and blends thereof and where the cationic species of the salt may be inorganic or organic.

8. The process of paragraph 1, wherein the multivalent metal salt is selected from the group consisting of calcium chloride, calcium acetate, magnesium chloride, magnesium acetate and blends thereof.

9. The process of paragraph 2, wherein the wherein the aminated polymer is water-soluble and is selected from the group consisting of poly(ethylene imine), poly(vinyl amine), copolymers of vinyl amine, aminated starches, amine functional poly(ethylene glycol), amine functional poly(propylene glycol and blends thereof.

10. The process of paragraph 1, wherein the polyurethane dispersion is selected from a non-ionic or cationic type, and wherein the acid value of the solid polymer is less than 10 mgKOH/g.

11. The process of paragraph 1, wherein the primer is applied to the first substrate, and after being dried has a film weight of between 0.1 and 5.0 g m$^{-2}$, and more preferably between 0.1 and 2.0 g m$^{-2}$.

12. The process of paragraph 1, wherein the primer is applied to the first substrate by a flexographic or gravure printing process and is dried before being printed with the pigmented aqueous inkjet composition.

13. The process of paragraph 1, wherein the polyurethane dispersion has a hydroxyl value, based on the dry polymer of greater than 10 mg KOH/g, and more preferably greater than 25 mgKOH/g.

14. The process of paragraph 1, wherein the polyurethane dispersion has an acid value, based on the dry polymer, of greater than 10 mgKOH/g.

15. The process of paragraph 1, wherein the first substrate is selected from the group consisting of polyester film, nylon film, polypropylene film, polyethylene film, cellulose acetate film, poly (vinyl chloride) film, a paperboard substrate and any coated derivative thereof.

16. The process of paragraph 15, wherein the coating on the plastic film is selected from the group consisting of an acrylic coating, an aluminum coating, an aluminum oxide coating, a silicon oxide coating and a copolymer of ethylene and vinyl alcohol.

17. The process of paragraph 15, wherein the first substrate is a paperboard which has a coating based on a water-soluble polymer and an inorganic filler.

18. The process of paragraph 1, wherein the second substrate is laminated to the first substrate using a liquid adhesive.

19. The process of paragraph 18, wherein the liquid adhesive is any 1-pack or 2-pack solvent-based, solvent-free or aqueous composition.

20. The process of paragraph 1, wherein the second substrate is laminated to the primed and printed first substrate by a thermal lamination process.

21. The process of paragraph 20, wherein the second substrate has a heat-sealable layer as part of its structure.

22. The process of paragraph 20, wherein the second substrate is applied to the first primed and printed substrate via a melt process, and wherein the liquid second polymer comprises polyethylene or poly(vinyl chloride), or any copolymer thereof.

23. A laminate prepared by any of the preceding paragraphs, wherein the bond strength between the first and second layers, as determined by a T-Peel bond strength assessment, is at least 1.0 N/15 mm, and preferably at least 1.5 N/15 mm.

24. The laminate prepared by any of the preceding paragraphs, wherein further layers may be applied to either side of the laminate in subsequent lamination processes 25. The laminate prepared by any of the preceding paragraphs, which is used in the manufacture of food, pharmaceutical, household or personal care packaging.

26. The laminate prepared by any of the preceding paragraphs, which is used in the preparation of décor laminates, including flooring and furniture manufacture.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Primers Comprising Water-Soluble Polymers of Vinyl Pyrrolidone and Vinyl Acetate These examples demonstrate a specific aspect of the invention, the use of copolymers of vinyl pyrrolidone and vinyl acetate as print receptive primers for the inkjet printing of aqueous inkjet inks according to the invention. This series of examples also shows the benefit of the inclusion of polyethylene imine, a water-soluble aminated polymer, according to the invention, in enhancing the lamination bond strength. The examples were assessed in a flexible film packaging application.

Table 1 shows the compositions for these primers. The primers were prepared by adding the components in the order as laid out in Table 1, with stirring between each addition. These primers were then applied to corona discharge-treated 12 µm PET film to achieve dry film weights of about 0.8 g m$^{-2}$. In the case of Inventive Example 2, an extra coated PET film with a coating weight of 0.4 g m$^{-2}$ was also prepared. The print receptivity of these primed PET films was assessed by inkjet printing a cyan, magenta, yellow and black aqueous inkjet ink set supplied by Sun Chemical (SunJet 50050, 40037, 10032 and 70041) on to the primed surface. These pigmented inks meet the requirements of the invention in that they comprise Daotan 7000, a hydroxyl-functional polyurethane dispersion (PUD) (i.e. an anionic PUD), with a hydroxyl value of greater than 100 mgKOH/g, and a propylene glycol concentration of 20-30% (w/w) and the composition of the cyan ink used is similar to "Ink A" in Table 4.

The print quality was assessed in terms of control of ink spread on the primed surface (dot control and line spread), mottle and graininess, as well as intercolor bleed. To assess the lamination performance of the primed PET films, both unprinted and printed primed PET films were laminated to a 50 µm low density polyethylene film using SunLam LX415/SP75 solvent based two-pack lamination adhesive, prepared according to the supplier's instructions for the preparation of digitally printed laminates. The adhesive was allowed to cure for 4 days before the bond strength of 15 mm strips of the laminates was assessed via a T-Peel test using a JJ Lloyd tensometer with a separation speed of 200 mm/min. The lamination bond strengths are provided as N/15 mm, the force required to separate the two films of the PET-LDPE laminate.

TABLE 1

| | | | | | | | |
|---|---|---|---|---|---|---|---|
| Primers Comprising Aqueous Solutions of Copolymers of Vinyl Pyrrolidone and Vinyl Acetate | | | | | | | |
| Materials | Comp. Ex. 1 | Comp. Ex. 2 | Inv. Ex. 1 | Inv. Ex. 2 | Inv. Ex. 3 | Inv. Ex. 4 | Inv. Ex. 5 |
| Deionized Water (%) | 54.6 | 54.2 | 55.2 | 54.6 | 54.1 | 54.7 | 54.6 |
| Ethanol (%) | 5.0 | 5.0 | 5.0 | 5.0 | 5.0 | 5.0 | 5.0 |
| Pluronic PE9400[1] (%) | 0.4 | 0.4 | 0.4 | 0.4 | 0.4 | 0.4 | 0.4 |
| W735[2] (%) | 40.0 | 40.0 | 38.0 | — | — | — | — |
| W635[3] (%) | — | — | — | 38.0 | 39.0 | 39.0 | — |
| 30% PVP K30[4] | | | | | | | 38.0 |
| 50% CaCl$_2$[5] (%) | — | 0.4 | 0.4 | 1.0 | 1.0 | 0.4 | 1.0 |
| Loxanol MI6735[6] | — | — | 1.0 | 1.0 | 0.5 | 0.5 | 1.0 |
| Total | 100 | 100 | 100 | 100 | 100 | 100 | 100 |
| Print Quality[7] (0.8 g m$^{-2}$ dry primer layer) | 1 | 3 | 4 | 5 | 5 | 4 | 5 |
| Print Quality (0.4 g m$^{-2}$ dry primer layer) | | | | 5 | | | |
| T-Peel Bond Strength over Primer; N/15 mm (0.8 g m$^{-2}$ dry primer layer) | 1.4 | 0.2 | 2.6 | 3.2 | 3.6 | 5.1 | 0.2 |
| T-Peel Bond Strength over Primer + Ink; N/15 mm (0.8 g m$^{-2}$ dry primer layer) | 1.0 | 2.0 | 1.6 | 2.6 | 2.8 | 3.7 | 1.2 |

TABLE 1-continued

| | Comp. Ex. 1 | Comp. Ex. 2 | Inv. Ex. 1 | Inv. Ex. 2 | Inv. Ex. 3 | Inv. Ex. 4 | Inv. Ex. 5 |
|---|---|---|---|---|---|---|---|
| Primers Comprising Aqueous Solutions of Copolymers of Vinyl Pyrrolidone and Vinyl Acetate | | | | | | | |
| Materials | | | | | | | |
| T-Peel Bond Strength over Primer; N/15 mm (0.4 g m⁻² dry primer layer) | | | | 5.0 | | | |
| T-Peel Bond Strength over Primer + Ink; N/15 mm (0.4 g m⁻² dry primer layer) | | | | 4.4 | | | |

Notes to Table 1:
[1]Pluronic PE9400 is a non-ionic surfactant (ex. BASF), which the inventors have found to have a positive effect on print quality with the SunJet inks (ex. Sun Chemical) described above;
[2]W735 is a 50% (w/w) solution in water of a copolymer of vinyl pyrrolidone and vinyl acetate, having 30% (w/w) of vinyl acetate as part of the dry polymer (ex. Ashland);
[3]W635 is a 50% (w/w) solution in water of a copolymer of vinyl pyrrolidone and vinyl acetate, having 40% (w/w) of vinyl acetate as part of the dry polymer (ex. Ashland);
[4]A 30% (w/w) solution of poly(vinyl pyrrolidone) (ex. Ashland);
[5]This is a 50% (w/w) solution of calcium chloride dehydrate in deionized water;
[6]Loxanol MI6735 is a polyethylene imine (ex. BASF);
[7]The print quality rating is an overall assessment of dot gain and line spread, intercolour bleed, mottle and graininess and has a rating value of between 1 (very poor print quality) and 5 (excellent print quality). A minimum print quality rating of 3 was judged sufficient for a primer to meet the requirements of the invention.

Table 1 demonstrates a number of features of the invention. Firstly, the advantage of a multivalent metal salt to provide the desired print quality when the primed substrate is printed with an aqueous inkjet ink prepared according to the invention (Comparative Example 2 compared with Comparative Example 1). However, Comparative Example 2 did not achieve a satisfactory bond strength over the primed-only PET film. Inventive Example 1 achieves satisfactory bond strengths over both the primed-only and primed and printed PET film through the addition of polyethylene imine vs. Comparative Example 2 whilst maintaining the print quality of Comparative Example 2. Inventive Examples 2 to 4 show that the copolymer of vinyl pyrrolidone and vinyl acetate having a vinyl acetate content of 40% (w/w) provides even better lamination bond strengths than the copolymer having 30% vinyl acetate. The inventors have shown that when Inventive Example 2 is prepared using a homopolymer of vinyl pyrrolidone (e.g. PVP K30 Ashland) to produce Inventive Example 5, satisfactory print quality is maintained when the primed layer is printed with the aqueous inkjet inks as outlined above, however, the laminate bond strength for the primed PET film was reduced.

As a further demonstration of the invention, the primer according to Inventive Example 2 was applied to corona discharge treated 23 μm oriented polypropylene film (MB400, ex. Jindal Films) to achieve a dry film weight of about 0.4 g m⁻². This was laminated to the LDPE film in the same manner as described above. The bond strength over the primed OPP film was 5.0 N/15 mm and the bond strength achieved with the primed and printed OPP film was 4.4 N/15 mm.

In a further demonstration of the invention, PET film primed (0.4 g m⁻² dry film weight) and printed using the primer coating laid out in Inventive Example 2 above was overprinted by a lab flexo printing method with Aqualam White, a water-based flexographic backing white ink (Sun Chemical) comprising an anionic polymeric dispersion. The PET film was laminated to LDPE film according to the method above. The bond strengths achieved were 5.0 N/15 mm for the PET film coated with the primer, and 3.5 N/15 mm for the primed PET film printed with the SunJet aqueous inkjet ink.

Primers Comprising Poly(Vinyl Alcohol) Water-Soluble Polymers

To show the benefit, again, of using primers comprising aqueous solution copolymers comprising vinyl acetate, Comparative Examples 3 and 4 and Inventive Example 6 were prepared and tested, as laid out in Table 2.

TABLE 2

Primers Comprising Aqueous Solutions of Poly(Vinyl Alcohol)s

| | Comp. Ex. 3 | Comp. Ex. 4 | Inv. Ex. 6 |
|---|---|---|---|
| Deionized Water (%) | 2.6 | 33.6 | 32.6 |
| Ethanol (%) | 5.0 | 5.0 | 5.0 |
| Pluronic PE9400 (%) | 0.4 | 0.4 | 0.4 |
| Aquaseal X2281[1] (%) | 90.0 | — | — |
| Makrovil PVA 0530[2] (%) | — | 60.0 | 60.0 |
| 50% CaCl₂ (%) | 1.0 | 1.0 | 1.0 |
| Loxanol MI6735 | 1.0 | — | 1.0 |
| Total | 100 | 100 | 100 |
| Print Quality[7] (0.35 g m⁻² dry primer layer) | 4 | 4 | 4 |
| T-Peel Bond Strength over Primer; N/15 mm (0.35 g m⁻² dry primer layer) | 0.2 | 0.4 | 3.6 |
| T-Peel Bond Strength over Primer + Ink; N/15 mm (0.35 g m⁻² dry primer layer) | 0.4 | 0.8 | 3.1 |

Notes to table 2: Aquaseal X2281 is a 20% (w/w) aqueous solution of a 98% hydrolyzed poly(vinyl alcohol) (ex. Paramelt);
[2]Makrovil 0530 is a 30% (w/w) aqueous solution of a 88% hydrolyzed poly(vinyl alcohol), i.e. 12% poly (vinyl acetate) content (ex. Indulor);
[7]Print Quality same as from Table 1 above.

Table 2 shows aspects of the invention relating to the primer. Comparative Example 3 comprising the highly hydrolyzed PVOH (poly(vinyl alcohol)) Aquaseal X2281, even with the addition of polyethylene imine did not deliver acceptable lamination bond strengths. Comparative Example 4 comprising the partially hydrolyzed PVOH Makrovil PVA 0530 without the addition of polyethylene imine although providing desirable print receptiveness did not achieve satisfactory bond strengths. However, the addition of polyethylene imine to Comparative Example 4 to produce Inventive Example 4, enabled satisfactory bond strengths to be achieved.

Primers Comprising Water-Dispersible Polymers

Table 3 provides the compositional details of primers comprising dispersions of polyurethanes and acrylic polymers meeting the requirements of the invention. The inventors have surprising found that the inclusion of the organically modified colloidal silica, Bindzil CC301 (ex. Akzo) improved the block resistance of the primers whilst maintaining satisfactory laminate bond strengths.

TABLE 3

Primers Comprising Polymer Dispersions

|  | Inv. Ex. 7 | Inv. Ex. 8 | Inv. Ex. 9 | Inv. Ex. 10 | Inv. Ex. 11 | Inv. Ex. 12 | Inv. Ex. 13 | Inv. Ex. 14 |
|---|---|---|---|---|---|---|---|---|
| Deionized Water (%) | 33.6 | 33.6 | 33.6 | 33.6 | 33.6 | 33.6 | 33.6 | 33.6 |
| Ethanol (%) | 5.0 | 5.0 | 5.0 | 5.0 | 5.0 | 5.0 | 5.0 | 5.0 |
| Pluronic PE 9400 (%) | 0.4 | 0.4 | 0.4 | 0.4 | 0.4 | 0.4 | 0.4 | 0.4 |
| Neorez R9340[1] (%) | 60.0 | 40.0 | — | — | — | — | — | — |
| Printrite DP375[2] (%) | — | — | 60.0 | 40.0 | — | — | — | — |
| Prox AM355[3] (%) | — | — | — | — | 60.0 | 40.0 | — | — |
| Prox SBP604[4] (%) | — | — | — | — | — | — | 60.0 | 40.0 |
| 50% CaCl$_2$ (%) | 1.0 | 1.0 | 1.0 | 1.0 | 1.0 | 1.0 | 1.0 | 1.0 |
| Bindzil CC301 (%) | — | 20.0 | — | 20.0 | — | 20.0 | — | 20.0 |
| Total | 100 | 100 | 100 | 100 | 100 | 100 | 100 | 100 |
| Print Quality (0.8-1.2 g m$^{-2}$ dry primer layer) | 4 | 4 | 4 | 4 | 3-4 | 3-4 | 3 | 3 |
| T-Peel Bond Strength over Primer; N/15 mm (0.35 g m$^{-2}$ dry primer layer) | >4.0 | 3.0 | 3.9 | 2.0 | 4.0 | 2.5 | 1.9 | 1.7 |
| T-Peel Bond Strength over Primer + Ink; N/15 mm (0.35 g m$^{-2}$ dry primer layer) | 3.1 | 2.8 | 3.2 | 3.0 | 1.7 | 2.3 | 2.3 | 2.1 |

Notes
to Table 3:
[1]Neorez R9340 is a non-ionic PUD (ex. DSM);
[2]Printrite DP375 is a non-ionic PUD (ex. Lubrizol);
[3]Prox AM355 is a non-ionic acrylic dispersions (ex. Synthron);
[4]Prox SBP604 is a cationic acrylic dispersion (ex. Synthron)

All the primers in Table 3 deliver satisfactory print quality and lamination bond strengths. The addition of the organically modified colloidal silica, Bindzil CC301, although causing minor loss in the laminate bond strengths, was observed to prevent any visible transfer (blocking) of dried primer to plain PET film (without corona discharge treatment) when a stack of 5 primed PET sheets (A5 size) was interleaved with uncoated PET film and blocked under a weight of 5 Kg for 4 hours.

Inkjet Compositions Comprising Anionic PUDs and Anionic Acrylic Dispersions

Table 4 provides the composition details of ink compositions comprising anionic polyurethane and anionic acrylic dispersions. The inks in table 4 are suitable for inkjet printing and were prepared by blending the components listed in Table 4 using a Silverson laboratory shear mixer. Using Inventive Primer Example 7 (Table 3), laminates having good bond strengths were prepared with all these inks.

TABLE 4

Inkjet Ink Compositions and Lamination Performance with Primer Inventive Example 7

|  | Ink A | Ink B | Ink C | Ink D | Ink E |
|---|---|---|---|---|---|
| Deionised water (%) | 19.8 | 19.8 | 19.8 | 19.8 | 19.8 |
| Propylene Glycol (%) | 25.0 | 25.0 | 25.0 | 25.0 | 25.0 |
| Tegowet KL245[1] (%) | 0.2 | 0.2 | 0.2 | 0.2 | 0.2 |
| Daotan 7000[2] (%) | 30.0 | — | — | — | — |
| Daotan 6425[3] (%) | — | 30.0 | — | — | — |
| Daotan 6460[4] (%) | — | — | 30.0 | — | — |
| Neorez R605[5] (%) | — | — | — | 30.0 | — |
| Joncryl FLX5010[6] (%) | — | — | — | — | 30.0 |
| Cyan Pigment Dispersion[7] (%) | 25.0 | 25.0 | 25.0 | 25.0 | 25.0 |
| Ink Viscosity (mPa · s) | 5.52 | 6.06 | 6.12 | 5.28 | 4.74 |

TABLE 4-continued

Inkjet Ink Compositions and Lamination Performance with Primer Inventive Example 7

|  | Ink A | Ink B | Ink C | Ink D | Ink E |
|---|---|---|---|---|---|
| pH | 8.75 | 8.15 | 7.95 | 8.55 | 8.50 |
| Varnish Resolubility | Re-soluble | Re-soluble | Slight | In-soluble | In-soluble |
| Print Quality (0.8-1.2 g m$^{-2}$ dry primer layer) | 4 | 4 | Not tested | Not tested | Not tested |
| T-Peel Bond Strength over Primer Example 6; N/15 mm (0.35 g m$^{-2}$ dry primer layer) | >4.0 | >4.0 | >4.0 | >4.0 | >4.0 |
| T-Peel Bond Strength over Primer Example 6 + Ink; N/15 mm (0.35 g m$^{-2}$ dry primer layer) | 3.2 | 2.9 | 2.5 | 3.3 | 2.4 |

Notes
to Table 4:
[1]Tegowet KL245 is a surfactant (ex. Evonik);
[2]Daotan 7000 is an anionic polyurethane dispersion, with a solid content around 40% and hydroxyl value of about 170 mgKOH/g;
[3]Daotan 6425 is an anionic polyurethane dispersion, with a solid content of around 40% and a hydroxyl value of about 55 mgKOH/g (ex. Allnex);
[4]Daotan 6460 is an anionic polyurethane dispersion, with a solid content around 35% and hydroxyl value of about 30 mgKOH/g;
[5]Neorez R605 is an anionic polyurethane dispersion, with a solid content of around 33% and hydroxyl value of less than 10 mgKOH/g (ex. DSM);
[6]Joncryl FLX5010 is an anionic aqueous self-crosslinking acrylic polymer dispersion, with a solid content of around 46% and a hydroxyl value of less than 10 mgKOH/g (ex. BASF);
[7]Cyan Pigment Dispersion is a proprietary dispersion of cyan 15:3 pigment, comprising about 16% (w/w) pigment.

The viscosities of the inks were measured at 32° C. using a Brookfield DV-II+ Pro Viscometer equipped with Spindle no. 18, at 100 rpm.

Resolubility Testing: Approximately 60 μm ink films were applied to glass slides using a No. 6 K-Bar applicator (ex. RK Print). The inks were then dried for 30 minutes at 40° C., before being immersed in an aqueous solution comprising 25% propylene glycol, 0.2% Tegowet KL245 and 0.2% of triethanolamine (this is referred to as 'Varnish'). Resolubility was assessed as: Highly Resoluble (the dried ink film dispersed in the soaking fluid in less than 2 minutes, with no visible signs of any undissolved ink); Resoluble (the dried ink film dispersed in the soaking fluid in 2 to 5 minutes, with no visible signs of any undissolved ink); Partial (evidence of the ink dispersing in the soaking fluid, but with minor undissolved ink particles persisting for more than 5 minutes); Slight (the ink print breaks up in to flakes which persist for more than 5 minutes, with very little evidence of the ink redispersing into the soaking fluid); Insoluble (no evidence for the ink redispersing into the soaking medium).

All of the inks of Table 4 provided good lamination strength.

The invention claimed is:

1. A process for preparing digitally printed laminates, comprising the steps of:

(i) applying a primer to a first substrate;

(ii) printing an aqueous pigmented inkjet printing ink onto the primed substrate of step (i) via a single pass printing operation;

(iii) laminating a second substrate to the primed and printed first substrate of steps (i) and (ii);

wherein the primer is an aqueous coating composition comprising:

(a) a water-dispersible polymer and a multivalent metal salt, wherein the water-dispersible polymer is selected from the group consisting of non-ionic polyurethane dispersions, cationic polyurethane dispersions, non-ionic acrylic dispersions, cationic acrylic dispersions, amphoteric acrylic dispersions and combinations thereof; or (b) a water-soluble polymer selected from copolymers comprising vinyl alcohol and vinyl acetate, copolymers comprising vinyl alcohol and vinyl amine, poly (vinyl pyrrolidone), copolymers comprising vinyl pyrrolidone and vinyl acetate, modified celluloses and water-soluble starches, wherein copolymers comprising vinyl alcohol and vinyl acetate comprise at least 5% vinyl acetate; a water-soluble aminated polymer comprising any blend of primary or secondary amines as part of its molecular structure; and a multivalent metal salt; and wherein the aqueous pigmented inkjet printing ink comprises an anionic polymeric dispersion or an anionic solution polymer.

2. The process of claim 1, wherein the aqueous pigmented inkjet printing ink comprises an anionic polymeric dispersion, wherein said anionic polymeric dispersion is an anionic polyurethane dispersion.

3. The process of claim 2, wherein the primer comprises a water-dispersible polymer and a multivalent metal salt.

4. The process of claim 3, wherein the primer further comprises an inorganic dispersion, wherein said inorganic dispersion is silica.

5. The process of claim 4, wherein the silica is an organically modified silica.

6. The process of claim 5, wherein the primer comprises a water-soluble polymer selected from copolymers comprising vinyl alcohol and vinyl acetate, copolymers comprising vinyl alcohol and vinyl amine, poly (vinyl pyrrolidone), copolymers comprising vinyl pyrrolidone and vinyl acetate, modified celluloses and water-soluble starches; a water-soluble aminated polymer comprising any blend of primary or secondary amines as part of its molecular structure; and a multivalent metal salt.

7. The process of claim 6, wherein the T-peel bond strength of the laminate is 1.0 N/15 mm, or greater.

8. The process of claim 7 wherein the water-soluble polymer of the primer is selected from copolymers comprising vinyl alcohol and vinyl acetate and copolymers comprising vinyl pyrrolidone and vinyl acetate.

9. The process of claim 8, wherein the vinyl acetate content of said copolymers is 10% (w/w), or greater.

10. The process of claim 9, wherein the multivalent metal salt is selected from the group consisting of calcium, magnesium, aluminum, zinc, titanium, zirconium and blends thereof and where the cationic species of the salt may be inorganic or organic.

11. The process of claim 10, wherein the aminated polymer is water-soluble and the water-soluble aminated polymer is poly (ethylene imine).

12. The process of claim 11, wherein the water-dispersible polymer of the primer is a non-ionic polyurethane dispersion or a cationic polyurethane dispersion.

13. The process of claim 12, wherein the aqueous pigmented inkjet printing ink comprises an anionic polyurethane dispersion having a molecular weight of less than 50,000.

14. The process of claim 13, wherein the aqueous pigmented inkjet printing ink comprises an anionic polyurethane dispersion having a hydroxyl value, based on the dry polymer, of greater than 25 mgKOH/g.

15. The process of claim 14 wherein the aqueous pigmented inkjet printing ink comprises less than 30% (w/w) of co-solvents, wherein the co-solvents are propylene glycol and/or glycerol.

16. The process of claim 15, wherein the first substrate is selected from the group consisting of polyester film, nylon film, polypropylene film, polyethylene film, cellulose acetate film, poly (vinyl chloride) film, a paperboard substrate and any coated derivative thereof.

17. The process of claim 16, wherein the second substrate is laminated to the first substrate using a liquid adhesive or wherein the second substrate is laminated to the primed and printed first substrate by a thermal lamination process.

18. The process of claim 17, wherein the second substrate is laminated to the primed and printed first substrate by a thermal lamination process and the second substrate is applied to the first primed and printed substrate via a melt process, wherein a liquid polymer is applied to the printed surface of the first primed and printed substrate to form the desired laminate, and wherein the liquid polymer comprises polyethylene or poly (vinyl chloride), or any copolymer thereof.

19. A laminate prepared by the method of claim 1, wherein the laminate has a bond strength between the first and second substrates, as determined by a T-Peel bond strength assessment, of at least 1.0 N/15 mm.

20. The laminate according to claim 19 which is used in the manufacture of food, pharmaceutical, household or personal care packaging or which is used in the preparation of décor laminates, including flooring and furniture manufacture.

21. A method for preparing digitally printed laminates via a single pass printing process, wherein the laminate comprises an aqueous coating composition and an aqueous pigmented inkjet printing ink, wherein said aqueous coating composition is applied to a substrate and said aqueous pigmented inkjet printing ink is printed onto the primed substrate, wherein the laminates have bond strengths in excess of 1.0 N/15 mm, as determined by a T-peel test, wherein said aqueous coating composition comprises:

(a) a water-dispersible polymer and a multivalent metal salt, wherein the water-dispersible polymer is selected from the group consisting of non-ionic polyurethane dispersions, cationic polyurethane dispersions, non-ionic acrylic dispersions, cationic acrylic dispersions, amphoteric acrylic dispersions and combinations thereof; or (b) a water-soluble polymer selected from partially hydro-lyzed poly (vinyl alcohol), copolymers containing vinyl alcohol and vinyl amine, poly (vinyl pyrrolidone), copolymers containing vinyl pyrrolidone and vinyl acetate, modified celluloses and water-soluble starches, wherein copolymers comprising vinyl alcohol and vinyl acetate comprise at least 5% vinyl acetate; a water-soluble aminated polymer comprising any blend of primary or secondary amines as part of its molecular structure; and a multivalent metal salt;

and wherein said aqueous pigmented inkjet printing ink comprises an anionic polymeric dispersion or an anionic solution polymer.

* * * * *